United States Patent [19]

Scholl et al.

[11] Patent Number: 6,027,767
[45] Date of Patent: Feb. 22, 2000

[54] CORROSION-INHIBITING POLYSULFIDE SEALANTS

[75] Inventors: Steven L. Scholl, Cottage Grove; Diane E. Waldoch, St. Paul, both of Minn.

[73] Assignee: H.B. Fuller Licensing Financing Inc., St. Paul, Minn.

[21] Appl. No.: 09/289,348

[22] Filed: Apr. 9, 1999

Related U.S. Application Data

[62] Division of application No. 08/961,119, Oct. 30, 1997.

[51] Int. Cl.7 .............................................. B05D 3/02
[52] U.S. Cl. ................. 427/384; 427/388.2; 427/388.5
[58] Field of Search ................... 252/389.52, 389.53, 252/389.54, 389.61, 389.62, 388, 389.1, 389.3, 394; 427/384, 388.2, 388.5

[56] References Cited

U.S. PATENT DOCUMENTS

| | | |
|---|---|---|
| 3,297,473 | 1/1967 | Bulbenko et al. . |
| 3,317,461 | 5/1967 | Plueddemann . |
| 3,659,896 | 5/1972 | Smith et al. . |
| 4,064,084 | 12/1977 | Blackwell . |
| 4,116,701 | 9/1978 | Conner, Sr. . |
| 4,145,326 | 3/1979 | Blackwell . |
| 4,612,129 | 9/1986 | DiBiase et al. . |
| 5,124,385 | 6/1992 | Hegedus et al. . |
| 5,139,700 | 8/1992 | Miksic et al. . |
| 5,209,869 | 5/1993 | Miksic et al. . |
| 5,236,983 | 8/1993 | Hegedus et al. . |
| 5,320,778 | 6/1994 | Miksic et al. . |
| 5,344,589 | 9/1994 | Miksic et al. . |
| 5,388,347 | 2/1995 | Kerttula et al. . |
| 5,403,501 | 4/1995 | Schwind . |
| 5,407,471 | 4/1995 | Rohr et al. . |
| 5,516,843 | 5/1996 | Scholl . |

Primary Examiner—Margaret Medley
Attorney, Agent, or Firm—Nancy N Quan

[57] ABSTRACT

Polysulfide corrosion inhibiting compositions used as adhesives and sealants for aircraft and military shelter industries are described as two-part compositions including a curing agent in the second part and a particular corrosion-inhibiting composition milled into the polysulfide in the first part where the corrosion inhibitors include a combination of a phosphosihicate with a mixture of alkali metal molybdate, ammonium benzoate, alkali metal nitrite, and benzotriazole.

4 Claims, No Drawings

CORROSION-INHIBITING POLYSULFIDE SEALANTS

This application is a Divisional of application Ser. No. 08/961,119, filed Oct. 30, 1997 allowed, which application are incorporated herein by reference.

FIELD OF THE INVENTION

This invention relates to polysulfide compositions containing a corrosion-inhibiting composition which protects metal substrates and is especially useful as an adhesive, sealant or coating in the aerospace and military shelter industries.

BACKGROUND OF THE INVENTION

Polysulfide sealants and adhesives are based on polysulfide liquid polymers which can be formulated to a one component or two component room temperature rubber curing system. In 1927, a chemist was trying to synthesize anti-freeze and discovered a gummy-like mass which would not dissolve. From this beginning, the technology advanced to provide the first liquid room temperature curing elastomeric polymer known as LP polymer. These liquid polysulfide polymers have been in use in sealants and adhesives since the 1940s. The primary fuiction of a sealant is to seal, with load-bearing properties being secondary. The primary function of an adhesive is the transfer of load-bearing properties between two or more substrates. Today, the worldwide polysulfide sealant/adhesive market uses 30–40 million pounds of LP polymer with growth expected at 3–5% per year.

Polysulfide sealants are used in any application in which an environment is to be isolated from external or internal factors and load-bearing properties as desired. These applications include aircraft fuel cell, pressure cabin sealers, flight decks, electrical potting, window assemblies, gaskets, seams, joints, and dams when adhering to metal, wood, concrete or composite material.

Polysulfide sealants are important due to their excellent fuel resistance, low-temperature flexibility and adhesion to a variety of surfaces. In addition, acceptable UV, moisture, and electrical resistance is present with good vibration-damping properties.

Polysulfide sealants exhibit these properties at low costs depending on the application. In the aerospace industry, polysulfide sealants are the most cost-effective means of sealing an aircraft.

Despite the long history of the use of polysulfides there is still a need for providing improved sealants especially with regard to corrosion inhibition where, for environmental concerns, nonchromated corrosion inhibitors are required.

Vapor phase corrosion-inhibiting compositions are described in U.S. Pat. Nos. 5,139,700; 5,209,869; 5,344,589; and 5,320,778. Mixtures of organic and inorganic salts form part of the composition with polyolefins. Phosphosilicates are not mentioned.

Corrosion-inhibiting compositions are described as part of lubricants in the fuel industry in U.S. Pat. Nos. 4,612,129; 5,338,537; 5,403,501; and 5,407,471. None of the patents describe the particular combination of a phosphosilicate and organic and inorganic salts.

Corrosion-inhibiting components are admixed with polyurethanes to form coatings as described in U.S. Pat. Nos. 5,124,385 and 5,236,983. These do not describe the particular combination of corrosion-inhibiting ingredients employed in the present invention.

SUMMARY OF THE INVENTION

We have discovered a specific corrosion-inhibiting composition containing a mixture of pigments, inorganic and organic salts, which when milled into an adhesive sealant, e.g., a polysulfide adhesive sealant, protects a metal substrate after application thereon. The pigments leach out of the cured adhesive sealant in water and protect the metal from corrosion up to one-half inch from the edge of the sealant. The corrosion-inhibiting adhesive sealant composition of the present invention has been found to inhibit corrosion under galvanic cell conditions.

Accordingly, the present invention is a two-part corrosion-inhibiting polysulfide composition including:

in a first part:
a) a polysulfide composition; and
b) a corrosion-inhibiting composition including:
i) from about 1–4 wt-%, based on the total weight of the first part, of phosphosilicate pigment, preferably calcium strontium zinc phosphosilicate; and
ii) from about 1–4 wt-%, based on the total weight of the first part, of a mixture of an alkali metal molybdate and benzotriazole; and in a second part:
a curing agent.

A second aspect of the present invention is a method of sealing and protecting a metal substrate from corrosion including the steps of:

a) mixing together the two-part polysulfide composition described above;
b) applying the mixed composition on a metal substrate; and
c) allowing the composition to cure thereon.

Still another aspect of the present invention is a new corrosion-inhibition composition containing:

a) 1–50 parts by weight of calcium strontium zinc phosphate; and
b) 1–50 parts by weight of a mixture of sodium molybdate, sodium nitrite, benzotriazole and ammonium benzoate.

DETAILED DESCRIPTION OF THE INVENTION

The present invention is a two-part corrosion-inhibiting polysulfide composition where the first part contains a polysulfide composition with corrosion-inhibiting elements in the form of a blend (composition) milled into the polysulfide. The second part includes a curing agent. Thus in applying the composition onto a metal substrate, the two parts are mixed preferably at the site of application and allowed to cure at room temperature on the substrate.

The present corrosion-inhibiting composition has several advantages. The composition:

is not hanifil to the environment and to those using it;
is as cost-effective as former chromate corrosion-inhibiting systems; and
outperforms other combinations of ingredients.

Polysulfide sealants, i.e., the polysulfide composition used in the present invention, are well known in the art. Such polysulfide sealants have been described in J. Appl. Polymer Sci., 41, 2837 (1990) and Kirk-Othmer Concise Encyclopedia of Chemical Technology, 18,814.

Polysulfides are polymers of bis-(ethylene oxy) methane containing disulfide linkages. The reactive terminal groups used for curing are mercaptans (—SH). The general structure is:

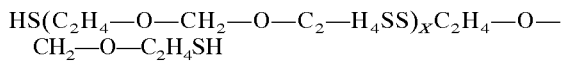

Preferred are the liquid polysulfide polymers, especially LP liquid polysulfide polymers available from Morton International, Woodstock, Ill. More preferred LP polymers are LP-3, LP-2, LP-32 from Morton International.

The polysulfide composition may be compounded with a variety of additives such as plasticizers, reinforcing agents, thixotropes, and extending fillers which influence the composition's dynamic properties, viscosity, wettability, adhesion, tensile and peel strength, hardness, and as described below, corrosion inhibitors. Plasticizers improve the working properties while lowering the modulus of the sealant. The plasticizer must be compatible with the cured sealant, should have low volatility, and must be safe. Polymeric and esteric types (e.g., phthalates) are commonly used. To promote adhesion, resole phenolic resins may be used as described in U.S. Pat. No. 5,516,843, which is incorporated herein by reference. Typical phenolic resin additives are Methylon AP-108, Durez 16674, Bakelite BRL 3741, and Resinex 468. Fillers increase the strength, impart needed rheological properties, and reduce the cost of sealants. Tensile properties are increased significantly, depending on the type of filler, its particle size, and the type of cure. Typical fillers include calcium carbonate (wet or dry ground limestone, precipitated), carbon blacks (furnace, thermal), calcined clay, silica and silicate fillers, and rutile titanium dioxide. Fillers may occupy up to about 40 wt-% of the polysulfide composition. Preferred fillers are calcium carbonate.

The above polysulfide compositions are cured by oxidizing the polymer's thiol (—SH) terminals to disulfide (—S—S—) bonds. The curing agents most commonly used are oxygen donating materials, preferably manganese dioxide, lead dioxide, calcium peroxide, zinc peroxide, cumene hydroperoxide, p-quinone dioxime and mixtures thereof. Most preferred is manganese dioxide. Lower valence metallic oxide, other organic peroxides, metallic paint dryers and aldehydes may also function as curatives. The curing compound as the principal component of the second part of the composition of the present invention may be suspended in an inert organic plasticizer, such as HB40, which is a hydrogenated perphenyl from Monsanto Corp., St. Louis, Mo., reaction modifiers and viscosity modifiers.

The first part or base compound and second part, curing agent, are combined in a fixed and prescribed weight ratio in a range from about 14:1 to about 5:1, preferably about 10:1 (first part to second part), to produce the adhesive/sealant. The sealant can be applied to the metal substrate by most conventional methods. These include spraying, brushing, and extruding using two-part room temperature meter-mix equipment to combine the components in the exact ratio. Hand mixing is also acceptable for sealant supplied in pints, quarts and gallon kits.

Sealant supplied in two-part injection kits or pre-mixed and frozen cartridges are applied using a pneumatic sealant applicator. Specialized sealant application tools the sealant technician to apply the sealant over a variety of rivets while maintaining an exact depth and contour to the sealant.

Once applied, the coated substrate is allowed to cure, typically overnight, at about room temperature, i.e., about 70°–77° F. (21°–25° C.). Moderate acceleration of cure can be accomplished by the use of heat, e.g., heat lamps, to about 140° F. (60° C.). Increasing humidity artificially will also increase the cure rate.

As an alternative embodiment of the present invention, the polysulfide component may be a polysulfide polymer/epoxy resin formed by co-reacting polysulfides with epoxy resins. Ratios of liquid polysulfide polymer, e.g., LP-3 described above, is preferred, to epoxy resin may vary between 1:2 and 2:1. Epoxy resins most widely used are, for example, EPON 820 and 828 (Shell), ERL-3794 (Union Carbide), and Araldite 6020 (CIBA). The epoxy-polysulfide reaction is prompted by organic primary and secondary amines or mixtures thereof. Preferred curing agents are 2,4,6-tri-(dimethylaminomethyl)phenol, triethylenetetramine, dimethylamino propylamine, dimethyl amino methylphenyl, methylenedianiline, diethylene triamine, benzyldimethylamine and mixtures thereof. The same fillers as described above may also be used in these compositions. A preferred polysulfide/epoxy resin compound is LP-32C available from Morton International.

As another alternative embodiment of the present invention, the polysulfide composition may include a polysulfide polymer with epoxy endblocks; i.e., an epoxy terminated polysulfide polymer. The basic structure of such polymer is:

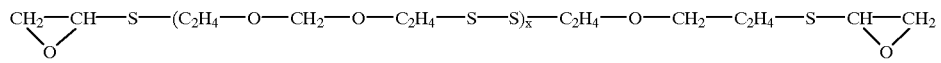

A preferred liquid epoxy terminated polysulfide is ELP™-3 available from Morton International. The polymer has the advantage of low (non-mercaptan) odor, has a viscosity at 25° C. of 20–30 poise, a specific gravity of 1.27 and an epoxy equivalent weight of 600–800. The polymer is cured with an aliphatic amine, preferably a primary or secondary amine or a mixture thereof, at room or elevated temperature. A latent catalyst such as dicyandiamide may be used for curing at room temperature. The same additives and fillers as above described may also be used with this epoxy-terminated polysulfide.

The corrosion-inhibiting portion of the adhesive/sealant composition of the present invention is a mixture of solids, having a particle size distribution of about 30 microns to about 1 micron, preferably about 20 microns to 2 microns, which are milled into the polysulfide composition as part of the first part of the two-part adhesive and sealant. The solids include a phosphosilicate pigment, particularly calcium strontium zinc phosphosilicate, SZP-391, a white, non-refractive, corrosion-inhibiting pigment or its equivalent, having a mean particle size of 2 microns and available from Halox Pigments, Hammond, Ind. This pigment forms anywhere from about 1 to about 4 wt-% of the total weight of the first part of the adhesive/sealant composition.

The corrosion-inhibiting composition also contains from about 1 to about 4 wt-% of the total weight of the first part of the adhesive sealant composition and mixed or blended with the above phosphosilicate a mixture of inorganic salts and organic salts or compounds, such as, for example, an alkali metal molybdate, e.g., sodium molybdate, and benzotriazole. A preferred mixture includes sodium molybdate and sodium nitrite in an amount of about 40–80 wt-% of the total mixture with about 20–60 wt-% of benzotriazole and a benzoate salt, e.g., ammonium benzoate.

The present invention also includes a particular corrosion-inhibiting composition containing from 1–50 parts by weight of calcium strontium zinc phosphosilicate and 1–50 parts by weight of a mixture of sodium molybdate, sodium nitrite, benzotriazole, and ammonium benzoate. The mixture preferably contains about 40–80 parts by weight of sodium molybdate and sodium nitrite and about 20–60 parts by weight of benzotriazole and ammonium benzoate. A more preferred mixture contains about 60–75 parts by weight of sodium molybdate, about 15–30 parts by weight of benzotriazole, and about 1–15 parts by weight of ammonium benzoate and sodium nitrite. A particularly preferred mixture containing sodium molybdate, benzotriazole, ammonium benzoate, and sodium nitrite is M-138C available from Cortec Corporation, St. Paul, Minn.

The following examples are merely to further illustrate by showing particular specifics of the present invention and are not meant to limit the many possible variations, and modifications within the scope of the present invention. The amounts of materials used, unless otherwise indicated, are in percent by weight.

EXAMPLES

Example 1

The following formulation was prepared:

|  |  |  | % by wt. |
|---|---|---|---|
| Part A |  |  |  |
| 1) | PS-1102A |  | 94.0 |
| 2) | SZP-391 |  | 3.0 |
| 3) | M-138C (Cortec) |  | 3.0 |
| Part B |  |  |  |
|  | PS-1102B |  | 100% |
| PS-1102A (1) of Part A) is the liquid polysulfide having the formulation: |  |  |  |
|  | POLYSULFIDE Polymer/Phenolic |  | 58.7 |
|  | Filler CaCO₃ |  | 32.0 |
|  | TiO₂ |  | 3.3 |
|  |  |  | 94.0% |

The curing agent in PS-1102B is manganese dioxide.

Components 2 and 3 were milled into PS-1102A until homogeneously mixed. Part A and Part B were mixed as 10/1 parts by weight and applied to untreated 7075 bare aluminum as described below.

Comparative Examples 2–5

Examples 2–5 were prepared in the same manner as Example 1 where the corrosion-inhibiting components 2), 3) were replaced by the following:

CE2: Zinc Molybdate, Zinc phosphate, and Benzoate
CE3: Zinc Benzoate
CE4: SZP-391
CE5: M-138C.

Test Method:

One unpainted aluminum test panel 2.5×5.5×0.040 inches was Scotch-Brite abraded and solvent wiped with methyl ethyl ketone (MEK). Four to six parallel strips (approximately 0.5 inches apart) of sealing compound Ex. 1 and CE 2–5) (0.5×2.5 ×0.02 inches) was applied across the width of the panel and cured for two days at room temperature, followed by 24 hours at 140° F. One unpainted (solvent-wiped) stainless steel test panel, 2.5×5.5×0.040 conforming to Mil-s-503a, Composition 301, was used to sandwich the cured sealant on the remaining panel. The sandwiched stainless steel panel was half immersed lengthwise in 3% NaCl solution for two weeks at room temperature.

The sandwiched panels were connected with electrical wiring to create a complete circuit to initiate the drive for corrosion. The top portion of the panel experienced wet/dry and oxygen-rich conditions. The bottom section was permanently immersed in saline solution.

The formulation of Example 1 outperformed those of comparative examples CE 2–5 under Galvanic Cell conditions. The formulation simulated chromates by leeching out of the sealant to protect metal up to one-quarter inch away from the sealant.

The amounts of corrosion observed on the panel based on a subjective assay were as follows:

| Example | % of Corrosion Observed |
|---|---|
| 1 | 3 |
| CE2 | 15 |
| CE3 | 40 |
| CE4 | 25 |
| CE5 | 10 |

We claim:

1. A method of sealing and protecting a metal substrate from corrosion comprising the steps of:

a) mixing together a two-part composition comprising:
   in a first part:
   i) a polysulfide composition; and
   ii) a corrosion-inhibiting composition consisting of:
      1) from about 1–4wt-% based on the total weight of the first part, of calcium strontium zinc phosphosilicate; and
      2) from about 1–4wt-% based on the total weight of the first part, of a mixture of an alkali metal molybdate, benzotriazole, ammonium benzoate and an alkali metal nitrite; and
   in a second part:
      a curing agent;
   wherein the first and the second parts are in a ratio of about 14:1 to 5:1;

b) applying the mixed composition on a metal substrate; and c) allowing the composition to cure thereon.

2. The method of claim 1, wherein the composition is mixed in a ratio of about 10 parts of the first part to 1 part of the second part.

3. The method of claim 1, wherein the mixed composition is applied on the substrate by spraying, brushing, or extruding.

4. The method of claim 1, wherein the composition is cured at about room temperature.

* * * * *